(12) United States Patent
Braun et al.

(10) Patent No.: US 12,090,961 B2
(45) Date of Patent: Sep. 17, 2024

(54) MOTOR VEHICLE HAVING A BOOT LID

(71) Applicant: Daimler AG, Stuttgart (DE)

(72) Inventors: Daniel Braun, Bad Liebenzell (DE); Jill Pasch, Loeffingen (DE)

(73) Assignee: Daimler AG, Stuttgart (DE)

( * ) Notice: Subject to any disclaimer, the term of this patent is extended or adjusted under 35 U.S.C. 154(b) by 202 days.

(21) Appl. No.: 17/625,543

(22) PCT Filed: Jul. 1, 2020

(86) PCT No.: PCT/EP2020/068511
§ 371 (c)(1),
(2) Date: Jan. 7, 2022

(87) PCT Pub. No.: WO2021/004854
PCT Pub. Date: Jan. 14, 2021

(65) Prior Publication Data
US 2022/0332256 A1    Oct. 20, 2022

(30) Foreign Application Priority Data

Jul. 8, 2019   (DE) ............... 10 2019 004 773.7

(51) Int. Cl.
*B60R 5/04*    (2006.01)
*B60R 7/02*    (2006.01)

(52) U.S. Cl.
CPC ............ *B60R 5/044* (2013.01); *B60R 7/02* (2013.01)

(58) Field of Classification Search
CPC ........... B60R 5/04; B60R 5/044; B60R 5/045; B60R 7/02
See application file for complete search history.

(56) References Cited

U.S. PATENT DOCUMENTS

| 6,832,799 | B2 * | 12/2004 | Haspel .............. B60R 7/02 |
| | | | 296/37.16 |
| 7,762,602 | B2 * | 7/2010 | Bohlke ............ B60R 5/045 |
| | | | 296/37.16 |

(Continued)

FOREIGN PATENT DOCUMENTS

| CN | 102529826 A | 7/2012 |
| CN | 205589119 U | 9/2016 |

(Continued)

OTHER PUBLICATIONS

PCT/EP2020/068511, International Search Report dated Sep. 10, 2020 (Two (2) pages).

(Continued)

*Primary Examiner* — Corey N Skurdal
(74) *Attorney, Agent, or Firm* — Crowell & Moring LLP

(57) ABSTRACT

A motor vehicle includes a boot lid and a receiving device. The receiving device is configured to receive an electric miniature vehicle. The receiving device has a frame, a flexible bag, and a cover that is openable, where the flexible bag and the frame are sealable by the cover from above. The receiving device in a mounted state is arrangeable behind a back seat of the motor vehicle such that the cover in a closed state forms a rear parcel shelf. The receiving device has an electric port where via the electric port the electric miniature vehicle is attachable to an on-board power supply of the motor vehicle for charging a battery of the electric miniature vehicle.

13 Claims, 2 Drawing Sheets

(56) References Cited

U.S. PATENT DOCUMENTS

| | | | | |
|---|---|---|---|---|
| 11,760,270 | B2* | 9/2023 | Rakoczi | B60R 9/055 |
| | | | | 224/331 |
| 2010/0270821 | A1* | 10/2010 | Ulita | B60R 5/04 |
| | | | | 296/37.16 |
| 2012/0146355 | A1 | 6/2012 | Dinger et al. | |
| 2016/0207467 | A1* | 7/2016 | Parlow | B60R 7/08 |
| 2017/0088058 | A1* | 3/2017 | Krishnan | B60R 5/045 |
| 2017/0104443 | A1* | 4/2017 | Backman | H02S 20/30 |

FOREIGN PATENT DOCUMENTS

| | | |
|---|---|---|
| CN | 109588046 A | 4/2019 |
| DE | 199 52 813 A1 | 8/2000 |
| DE | 100 47 541 A1 | 1/2002 |
| DE | 10 2006 013 974 A1 | 9/2007 |
| DE | 20 2007 016 318 U1 | 3/2008 |
| DE | 10 2010 046 635 A1 | 3/2012 |
| DE | 10 2011 018 309 A1 | 10/2012 |
| DE | 20 2018 100 014 U1 | 3/2018 |
| EP | 0 713 805 A1 | 5/1996 |
| EP | 2 468 574 A1 | 6/2012 |
| JP | 2002-114103 A | 4/2002 |
| JP | 2002-154378 A | 5/2002 |
| KR | 1998-042217 U | 9/1998 |
| KR | 1999-0031760 U | 7/1999 |

OTHER PUBLICATIONS

German-language German Office Action issued in German application No. 10 2019 004 773.7 dated Dec. 3, 2019 (Six (6) pages).
Chinese-language Chinese Office Action issued in Chinese Application No. 202080049774.7 dated Mar. 13, 2024 (8 pages).

* cited by examiner

MOTOR VEHICLE HAVING A BOOT LID

BACKGROUND AND SUMMARY OF THE INVENTION

The present invention relates to a motor vehicle having a boot lid. The invention moreover relates to a receiving device for an electric miniature vehicle for such a motor vehicle.

Electric miniature vehicles, for example E-scooters, electric kick scooters, hoverboards, monowheels or similar, are enjoying increasing popularity and, in particular in areas of high population density, make up an increasingly higher number of traffic participants. However, to cover longer distances, it is often essential to take such electric miniature vehicles in a motor vehicle which is, however, currently uncomfortable, and there are no corresponding devices for receiving or charging a battery of the electric miniature vehicle in the motor vehicle. The electric miniature vehicles are therefore often left unsecured in a cargo area, which, however, has the disadvantage that simultaneous access to other cargo goods is not possible or only in an uncomfortable manner because of the size of the electric miniature vehicle. Moreover, such electric miniature vehicles, yet also non-electrically operated kick scooters, would have to be secured during the journey in order to not pose any potential danger in the event of a crash. A further disadvantage of simply storing such a kick scooter or generally such an electric miniature vehicle in the boot emerges from the fact that, depending on weather conditions, for example in the event of rain, a wet or dirty electric miniature vehicle not only gets the boot dirty, but also other cargo stored in it in certain circumstances. In modern motor vehicles, charging a battery of the electric miniature vehicle using an on-board power supply of the motor vehicle is usually not provided, which also constitutes a considerable disadvantage since otherwise the electric miniature vehicle could simply be charged when driving the motor vehicle using its alternator.

A motor vehicle having a bracket is provided in DE 199 52 813 A1, in which an electrically driven small vehicle having at least two wheels can be received. The electrically driven small vehicle here engages with its wheels in corresponding hollows, wherein the bracket is additionally fixedly connected to the motor vehicle and has a charging device for charging a battery of the electrically driven small vehicle. However, it is disadvantageous in this embodiment that only an electrically driven small vehicle specifically designed for the bracket can be reliably transported using it and optionally also charged, since the hollow of the bracket is adjusted to the tyre size and also to an axle spacing of the electrically driven small vehicle.

A further motor vehicle having a cargo space is known from DE 10 2006 013 974 A1, in which a storage container is used which can be fixed on an underside of a rear parcel shelf and can be moved for loading into at least one loading and/or unloading position. The storage container here has a frame, a contact surface and at least one substantially inelastic side wall connecting the contact surface to the frame, which side wall can be deformed, such that the height of the storage container is variable. However, this embodiment offers the disadvantage that the cargo space, in particular the boot, has to be cleared first in order to reach the storage container.

A vehicle cargo space having a back shelf is known from DE 20 2018 100 014 U1, which interacts with a back seat in order to define a cargo region below the back shelf, wherein the back shelf has an umbrella storage container having a draining hole and an umbrella draining system having a flexible tube inside the cargo region in fluidic connection with the back shelf and a bodywork draining system, such that water drains from the container into the tube in order to be discharged via the bodywork draining system.

The present invention is thus concerned with the problem of specifying an improved or at least an alternative embodiment for a motor vehicle of the generic type, the embodiment enabling, in particular, improved carriage of electrically driven miniature vehicles in a motor vehicle.

The present invention is based on the general idea of providing a removable receiving device for an electric miniature vehicle in a motor vehicle having a boot lid, wherein this receiving device has a frame, a flexible bag and a cover that seals the receiving device from above but can still be opened. The receiving device in the mounted state is here arranged behind back seats of the motor vehicle in the driving direction in such a way that the cover in the closed state forms a rear parcel shelf. Thus, it is firstly possible with the motor vehicle according to the invention to overcome virtually all disadvantages known up until now from the prior art and thus to foster an alternative movement possibility, namely by means of electrically driven miniature vehicles, such as E-scooters, for example. As a result of the stable frame, on one hand, a reliable and tight fixing of the receiving device in the motor vehicle is possible, whereby the electric miniature vehicle no longer has to be left in the cargo space in an unsecured manner. As a result of the flexible bag, the electric miniature vehicle can additionally be arranged separately from the other cargo and above it, which, on one hand, offers the great advantage that a dirty electric miniature vehicle cannot cause any dirtying of the boot or cargo space and/or the rest of the cargo stored in the cargo space and, additionally, the cargo space also remains inherently accessible virtually without restrictions when an electric miniature vehicle arranged in the receiving device is present. In particular, no advance clearing out of the cargo space is required in order to reach the receiving device and an electric miniature vehicle arranged therein, for example. In addition, as a result of the cover that can be sealed from above and is to be opened, cargo securing can be achieved, which, in particular, reliably prevents the electric miniature vehicle flying around in an uncontrolled manner in the event of a crash. As a result of the arrangement of the receiving device in the mounted state behind the back seats of the motor vehicle, a surface of the cover can additionally be used as a rear parcel shelf in the conventional sense, which has not been possible with flexible cargo space covers known up until now, since these sagged downwards when objects were placed on top. All in all, with the motor vehicle according to the invention, carriage of an electric miniature vehicle in the motor vehicle can thus be achieved in a reliable, roadworthy and protected manner separately from other cargo. As a result of the possibility of removing the receiving device from the motor vehicle, an easy adaptation of the motor vehicle for the transportation of electric miniature vehicles can additionally be achieved. A fixing of the receiving device in the cargo space of the motor vehicle on the boot side can here be carried out analogously to previous fixings in cargo space covers, such that such a receiving device can be reliably fixed in the cargo space of the motor vehicle and removed from it again comparatively simply, for example via latch connections.

In an advantageous development of the solution according to the invention, a reinforcement is provided on the frame, which forms a protecting wall when the receiving device is mounted. Such a protecting wall here runs, for example, substantially vertically or in parallel to a rear side of a backrest of the back seat of the motor vehicle and, in the event of a crash, prevents an intrusion of the accelerated electric miniature vehicle into the backrest of the back seat. Such a protecting wall can be connected to the frame via a hinge, for example, whereby, with a receiving device removed from the motor vehicle, this can be aligned in parallel to the frame, i.e., folded onto it and thus is housed in a space-saving manner.

It can additionally or alternatively be provided that the boot lid has a holding contour which fixes the cover of the receiving device in the closed state when the boot lid is closed. Such a holding contour can be formed, for example, in the manner of a retaining collar and can reliably fix the cover of the receiving device, in particular in the event of a crash, against being opened unintentionally. The holding contour formed on the boot lid can here be kept so small that it fulfils the purpose of fixing the cover when the boot lid is closed, yet, when the boot lid is open, does not form any kind of disrupting contour which makes it difficult for a user to access the cargo space from the boot side, in particular.

In a further advantageous embodiment of the solution according to the invention, the cover of the receiving device can be sealed. In doing so, an additional protecting device for the electric miniature vehicle stored in the receiving device can be created, whereby an anti-theft device, for example, is created, which prevents an easy removal of the electric miniature vehicle from the receiving device when only the boot lid is open but the cover is sealed.

In a further advantageous embodiment of the solution according to the invention, the frame and/or the cover are/is formed from fiber-reinforced plastic or from aluminum. Carbon reinforced plastics in particular offer the great advantage that they are not only formed easily but also exceptionally stably and solidly. A frame formed, for example, from carbon reinforced plastic is thus, in association with a correspondingly stably formed bag, without issue able to reliably receive not only the corresponding electric miniature vehicle, but also a charging device, for example, for it.

Expediently, at least one fixing element, for example a tensioning strap, is provided, via which the electric miniature vehicle can be fixed in the receiving device. Such a fixing element can also be formed, for example, from a normal strap, which has a Velcro fastener on its respective free end, such that two opposite strap ends can be fixed to each other via this Velcro fastener and also the electric miniature vehicle can be fixed in the receiving device.

According to the invention, an electric port is provided in the receiving device, via which port a charging device can be attached to an on-board power supply of the motor vehicle for charging a battery of the electric miniature vehicle. Thus, a comparatively simple electric contacting of the charging device with the on-board power supply of the motor vehicle is possible using such an electric port, for example a 12-volt port, such that, in a favourable case, charging the electric miniature vehicle when driving the motor vehicle via its alternator is made possible. This constitutes a considerable advantage, since the electric miniature vehicle can be charged independently of a stationary power supply.

The present invention is further based on the general idea of specifying a receiving device for an electric miniature vehicle described above, which has a frame, a flexible bag and a cover that seals the bag and the frame from above and can be opened. With an arrangement in a corresponding motor vehicle, such a receiving device enables a reliable, clean and roadworthy carriage of an electric miniature vehicle, or generally a kick scooter, in the motor vehicle, since the electric miniature vehicle or the kick scooter can be carried along in the receiving device according to the invention in a crash-safe manner and additionally separately from other cargo goods. In doing so, it is also possible, for example, to carry such an electric miniature vehicle in a motor vehicle when it is dirty, which up until now when simply storing in a cargo space could have led to the cargo space and/or adjacent cargo becoming dirty. The flexible bag is preferably formed from an elastic, but moisture-impermeable or water-impermeable or water-repellent material, such that, for example, an electric miniature vehicle dirtied by means of snow and/or ice can also be carried along without issue in the receiving device, without here having to worry about cargo arranged below it being dirtied when the snow or ice melts in the motor vehicle.

By means of the receiving device according to the invention, it is additionally possible to create a rear parcel shelf on the cover thereof, on which rear parcel shelf further objects can be placed. In addition, virtually uninhibited and free and thus comfortable access to the cargo space can be ensured by means of such a receiving device.

In an advantageous development of the receiving device according to the invention, a reinforcement is provided on the frame thereof, which reinforcement forms a protecting wall. Such a protecting wall here runs, for example, substantially vertically or in parallel to a rear side of a backrest of a back seat of a motor vehicle when the receiving device is mounted and, in the event of a crash, prevents an intrusion of the accelerated electric miniature vehicle into the backrest of the back seat. Such a protecting wall can be connected to the frame via a hinge, whereby this can be folded on in a space-saving manner.

In a further advantageous embodiment of the receiving device according to the invention, the cover thereof can be sealed. In doing so, an additional theft-prevention device can be created.

In a further advantageous embodiment of the solution according to the invention, the frame and/or the cover is/are formed from fiber-reinforced plastic or from aluminum. Carbon fiber-reinforced plastics in particular offer the great advantage that they are formed very easily and additionally exceptionally stably. A frame formed from carbon fiber-reinforced plastic by way of example is thus, in association with a correspondingly stably formed bag, able without issue to reliably receive not only the corresponding electric miniature vehicle, but also a charging device, for example, formed for this.

Expediently, the receiving device according to the invention has at least one fixing element, for example a tensioning strap, via which the electric miniature vehicle can be fixed in the receiving device. Such a fixing element can also be formed, for example, from a normal strap, which has a Velcro fastener on its respective free end, such that two opposite strap ends can be fixed to each other via this Velcro fastener and, moreover, the electric miniature vehicle can be fixed in the receiving opening.

In a further advantageous embodiment of the receiving device according to the invention, an electric port is provided, via which a charging device for charging a battery of the electric miniature vehicle can be attached to an on-board power supply of a motor vehicle.

Further important features and advantages of the invention emerge from the sub-claims, from the drawings and from the corresponding description of the figures by means of the drawings.

It is understood that the features mentioned above and still to be explained below can be used not only in the respectively specified combination, but also in other combinations or on their own without leaving the scope of the present invention.

Preferred exemplary embodiments of the invention are depicted in the drawings and are explained in more detail in the description below, wherein the same reference numerals relate to the same or similar or functionally identical components.

DETAILED DESCRIPTION OF THE DRAWINGS

Figure 1:
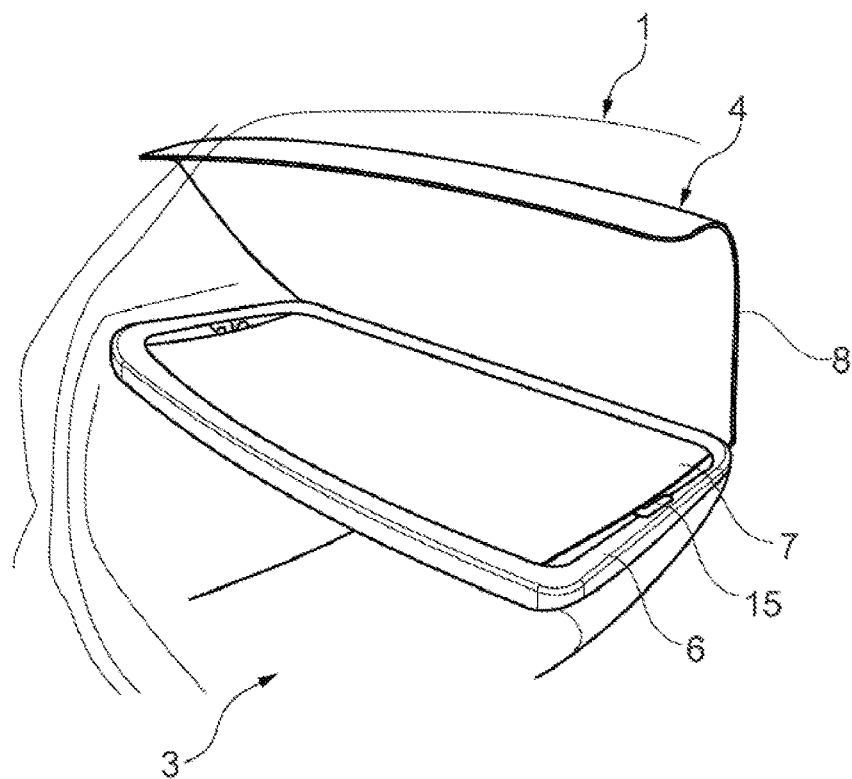
FIG. 1 is a partial view from behind of a motor vehicle according to the invention having a receiving device arranged therein for an electric miniature vehicle.
Figure 2:
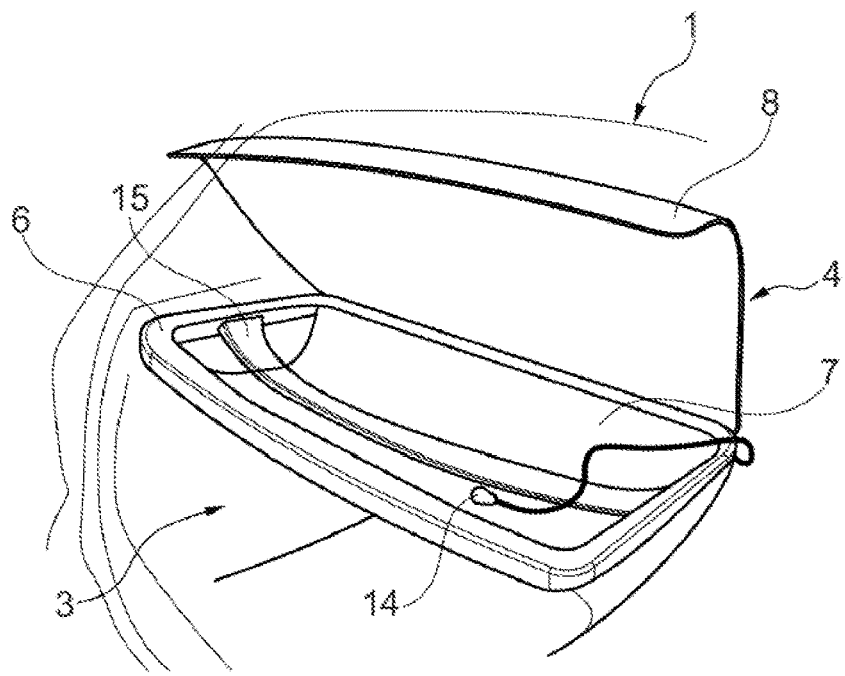
FIG. 2 is a depiction as in FIG. 1, but with a receiving device having an electric port.
Figure 3:
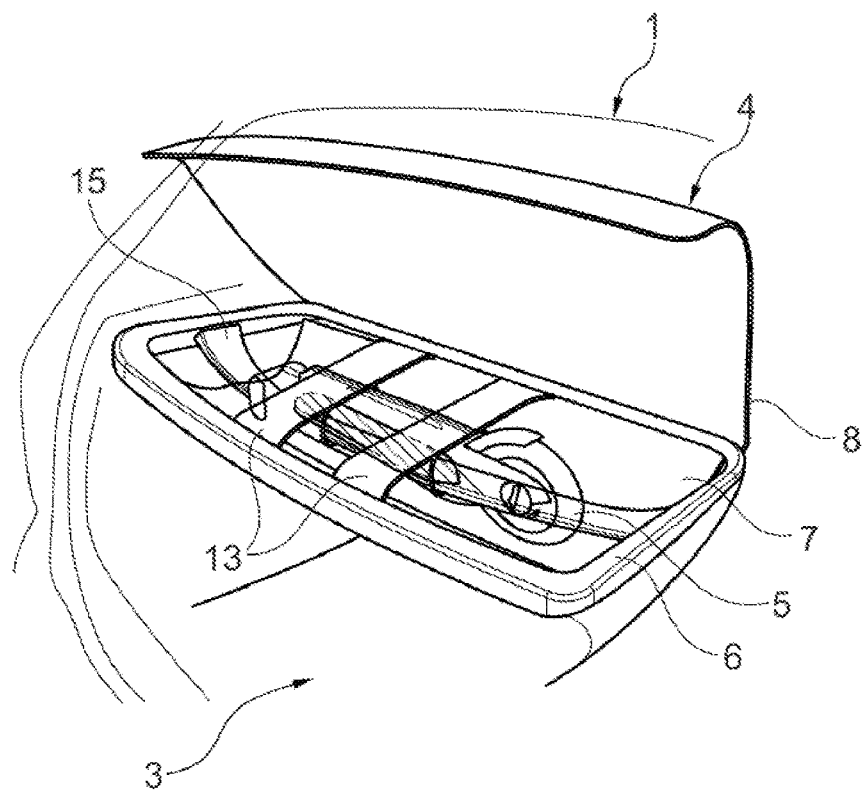
FIG. 3 is a depiction as in FIG. 1, but with an electric miniature vehicle arranged in the receiving device.
Figure 4:
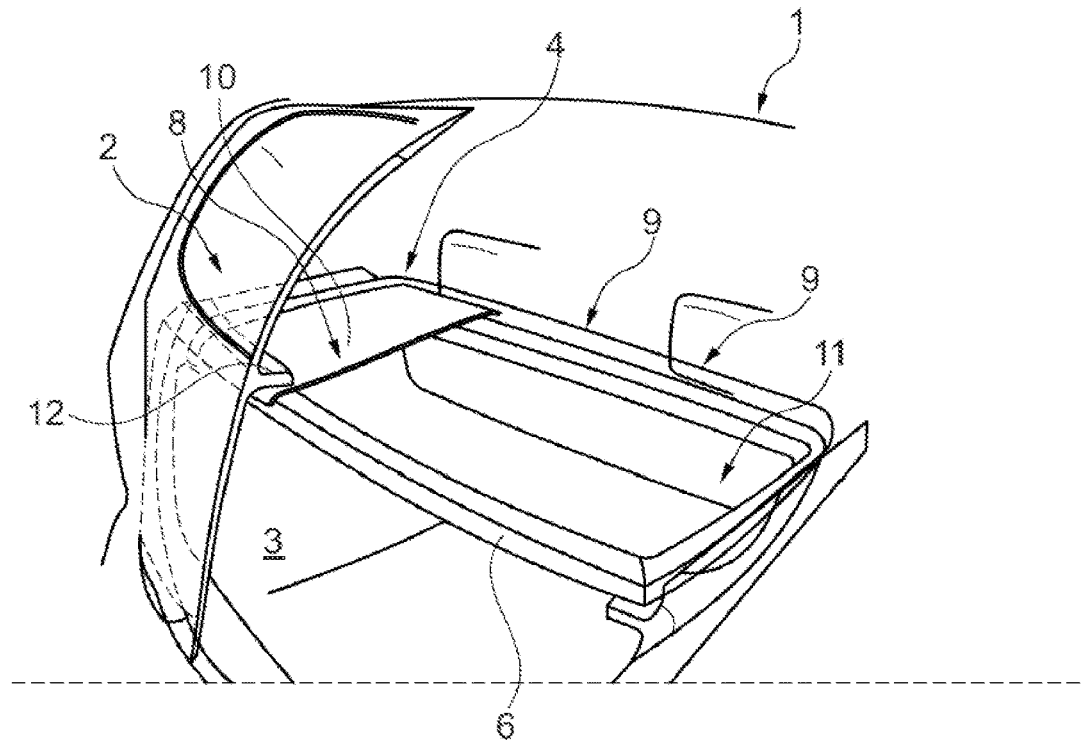
FIG. 4 is a partial, sectional view from behind of a motor vehicle according to the invention with the boot lid closed.

Corresponding to FIGS. 1 to 4, a motor vehicle 1 according to the invention has a boot lid 2 only depicted in FIG. 4 and a receiving device 4 removably arranged in a rear cargo space 3 for an electric miniature vehicle 5 (c.f. FIG. 3). The receiving device 4 according to the invention has a frame 6, a flexible bag 7 and a cover 8 that seals the bag 7 and the frame 6 from above and can be opened. The receiving device 4 in the mounted state is here arranged or can be arranged behind back seats 9 of the motor vehicle 1 in such a way that the cover 8 in the closed state forms a rear parcel shelf (c.f. FIG. 4).

With the receiving device 4 according to the invention, it is firstly possible to arrange an electric miniature vehicle 5, such as an E-scooter, a hoverboard, a monowheel or an electric kick scooter, for example, in the motor vehicle in a reliable, roadworthy and tidy manner and, above all, such that it can be transported comfortably. The great advantage of the receiving device 4 according to the invention is, in particular, that the electric miniature vehicle 5 can be arranged separately from the rest of the cargo space 3 above it in the bag 7 of the receiving device 4, such that the cargo space 3 itself can remain accessibly virtually without restrictions when the receiving device 4 is mounted and thus in an exceptionally comfortable manner. In addition, such a receiving device 4 also enables transportation of a dirty electric miniature vehicle 5 in the motor vehicle 1 without having to worry about the rest of the cargo arranged in the cargo space 3 getting dirty, since the electric miniature vehicle 5 is arranged in the receiving device 4 separately from the rest of the cargo space 3.

In addition, a reinforcement 11 (c.f. FIG. 4) can be provided on the frame 6 of the receiving device 4, the reinforcement forming a protecting wall when the receiving device 4 is mounted and preventing, for example, the electric miniature vehicle 5 arranged in the receiving device 4 from penetrating into a backrest of the back seat 9 in the event of a crash. The protecting wall 11 can here either be mountable on the frame 6 or fixed to it via a hinge, such that it can be folded onto the frame 6 in a space-saving manner when the receiving device 4 is removed from the motor vehicle 1. The cover 8 is pivotably mounted on the frame 6 via a hinge and is easy to open, wherein a lock can additionally be provided, via which the cover 8 can be sealed, such that the electric miniature vehicle 5 arranged in the receiving device 4 can also be housed in the motor vehicle 1 in a theft-proof manner.

If we consider the boot lid 2 of the motor vehicle 1 according to FIG. 4, then it can be seen that a holding contour 12, in particular in the form of a retaining collar, is arranged on it which fixes the cover of the receiving device 4 in the closed state when the boot lid 2 is closed. In doing so, an unintentional opening of the cover 8 during the journey and, in particular, also in the event of a crash can be reliably avoided.

In general, the frame 6 and/or the cover 8 can be formed from fiber-reinforced plastic or from aluminum. Fiber-reinforced plastic in particular offers the great advantage that it has an exceptionally high strength with a simultaneously low weight. For reasons of design, it can of course also be provided that the cover 8 is formed from polished aluminum, wherein it is of course also possible to equip different equipment variants with different covers 8.

If we consider FIG. 3, then a fixing element 13, here even two fixing elements 13, can be seen on the receiving device 4 illustrated there, the fixing elements being formed, for example, as a kind of tensioning strap or enabling a fixing of the electric miniature vehicle 5 in the bag 7 via a corresponding Velcro fastener. The fixing elements 13 are here formed in such a way that, on one hand, they fix the electric miniature vehicle 5 reliably in the bag 7, yet are simultaneously easy to open or to close, in order to thus enable a high level of operating comfort.

If we consider the receiving device 4 according to FIG. 2, then an electric port 14 can be seen on it, via which a charging device for charging a battery of the electric miniature vehicle 4 can be attached to an on-board power supply of the motor vehicle 1. Such an electric port 14 can be, for example, a 12 Volt port, which makes it possible to charge the battery of the electric miniature vehicle 5 when driving via the alternator of the motor vehicle 1, for example.

The bag 7 of the receiving device 4 according to the invention is here formed to be flexible and thus enables a problem-free insertion of the electric miniature vehicle 5. Moreover, an elastic strap 15 can of course also be provided, which prevents the bag 7 from sagging too deeply with an electric miniature vehicle 5 arranged therein. In the receiving device 4 according to the invention, not only electric miniature vehicles 5, such as the E-scooters mentioned above, for example, can be transported, but also generally other objects or means of transportation, such as a non-electrically driven kick scooter, for example.

Due to the circumstance that the receiving device 4 according to the invention can additionally be removed from the motor vehicle 1 comparatively simply, it can be arranged exceptionally comfortably in the motor vehicle 1, if carriage of an electric miniature vehicle 5 is desired, while it can also be removed from the motor vehicle 1 comparatively simply when no electric miniature vehicle 5 is to be taken along, for example, or the entire cargo space 3 has to be available without restrictions in order to transport larger objects, for example.

Thus, with the receiving device 4 according to the invention and the motor vehicle 1 according to the invention, it is possible to combine the increasing electromobility, for example in the form of electric miniature vehicles 5, with motor vehicles 1, for example by them being able to be transported in the receiving device 4 according to the invention in a reliable, protected and additionally crash-safe manner. Moreover, as a result of the electrical port 14, charging the battery of the electric miniature vehicle 5 can even be made possible when travelling in the motor vehicle 1. Mounting or dismounting the receiving device 4 according to the invention in or out of the motor vehicle 1 can here be carried out analogously to the mounting or dismounting of a previous cargo space cover and can thus be carried out exceptionally comfortably, since only latch connections or clip connections, for example, have to be released or fixed in order to do so.

The invention claimed is:

1. A motor vehicle, comprising:
a boot lid; and
a receiving device, wherein the receiving device is configured to receive an electric miniature vehicle, wherein the receiving device has a frame, a flexible bag, and a cover that is openable, and wherein the flexible bag and the frame are sealable by the cover from above;
wherein the receiving device in a mounted state is arrangeable behind a back seat of the motor vehicle such that the cover in a closed state forms a rear parcel shelf;
wherein the receiving device has an electric port and wherein via the electric port the electric miniature vehicle is attachable to an on-board power supply of the motor vehicle for charging a battery of the electric miniature vehicle;
wherein the boot lid has a retaining collar which fixes the cover of the receiving device in the closed state when the boot lid is closed.

2. The motor vehicle according to claim 1, wherein a reinforcement is disposed on the frame and wherein the reinforcement forms a protecting wall in the receiving device.

3. The motor vehicle according to claim 1, wherein the cover is sealable and wherein the frame and the cover are formed from a fiber-reinforced plastic or from aluminum.

4. The motor vehicle according to claim 1, further comprising a fixing element, wherein via the fixing element the electric miniature vehicle is fixable in the receiving device.

5. The motor vehicle according to claim 4, wherein the fixing element is a tensioning strap.

6. The motor vehicle according to claim 1, further comprising an elastic strap disposed in the flexible bag, wherein the elastic strap is attached to a first side of the frame and a second side of the frame and extends from the first side of the frame to the second side of the frame and wherein the elastic strap prevents the flexible bag from sagging too deeply when the electric miniature vehicle is received in the flexible bag.

7. The motor vehicle according to claim 1, wherein the flexible bag is formed from an elastic material that is moisture-impermeable or water-impermeable or water-repellent.

8. A receiving device of a motor vehicle having a boot lid for an electric miniature vehicle, comprising:
a frame, a flexible bag, and a cover that is openable, and wherein the flexible bag and the frame are sealable by the cover from above; and
an elastic strap disposed in the flexible bag, wherein the elastic strap is attached to a first side of the frame and a second side of the frame and extends from the first side of the frame to the second side of the frame and wherein the elastic strap prevents the flexible bag from sagging too deeply when the electric miniature vehicle is received in the flexible bag.

9. The receiving device according to claim 8, wherein a reinforcement is disposed on the frame, wherein the reinforcement forms a protecting wall in the receiving device.

10. The receiving device according to claim 8, wherein the cover is sealable and wherein the frame and the cover are formed from a fiber-reinforced plastic or from aluminum.

11. The receiving device according to claim 8, further comprising a fixing element, wherein via the fixing element the electric miniature vehicle is fixable in the receiving device.

12. The receiving device according to claim 11, wherein the fixing element is a tensioning strap.

13. The receiving device according to claim 8, wherein the flexible bag is formed from an elastic material that is moisture-impermeable or water-impermeable or water-repellent.

* * * * *